(12) United States Patent
Keselman et al.

(10) Patent No.: US 10,586,057 B2
(45) Date of Patent: Mar. 10, 2020

(54) PROCESSING DATA QUERIES IN A LOGICALLY SHARDED DATA STORE

(71) Applicant: INTUIT INC., Mountain View, CA (US)

(72) Inventors: Gleb Keselman, Hod-Hasharon (IL); Ernesto Nebel, San Diego, CA (US); Jeffery Weber, San Diego, CA (US); Noah Kauhane, San Diego, CA (US); Vinu Somayaji, San Diego, CA (US); Yaron Sheffer, Hod-Hasharon (IL)

(73) Assignee: INTUIT INC., Mountain View, CA (US)

( * ) Notice: Subject to any disclaimer, the term of this patent is extended or adjusted under 35 U.S.C. 154(b) by 218 days.

(21) Appl. No.: 15/815,239

(22) Filed: Nov. 16, 2017

(65) Prior Publication Data

US 2019/0147170 A1 May 16, 2019

(51) Int. Cl.
*G06F 21/60* (2013.01)
*H04L 9/08* (2006.01)
*G06F 16/245* (2019.01)
*G06F 16/27* (2019.01)
*G06F 21/62* (2013.01)

(52) U.S. Cl.
CPC .......... *G06F 21/602* (2013.01); *G06F 16/245* (2019.01); *G06F 16/278* (2019.01); *G06F 21/6227* (2013.01); *H04L 9/08* (2013.01); *H04L 9/0869* (2013.01); *H04L 9/0891* (2013.01); *H04L 9/0894* (2013.01)

(58) Field of Classification Search
CPC . G06F 21/602; G06F 21/6218; H04L 9/0861; H04L 9/0869
See application file for complete search history.

(56) References Cited

U.S. PATENT DOCUMENTS

| 2008/0137841 A1 | 6/2008 | Jajodia |
| 2011/0161656 A1* | 6/2011 | Rao ................. G06F 21/335 713/153 |

(Continued)

FOREIGN PATENT DOCUMENTS

| GB | 2479074 A | 9/2011 |
| WO | 2013049689 A1 | 4/2013 |
| WO | 2016-200461 A2 | 12/2016 |

OTHER PUBLICATIONS

PCT/US2018/044785, International Search Report dated Nov. 28, 2018, 15 pages.

(Continued)

*Primary Examiner* — Ponnoreay Pich
(74) *Attorney, Agent, or Firm* — Patterson + Sheridan, LLP

(57) ABSTRACT

The present disclosure relates to processing data queries on a logically sharded data store. An example method generally includes receiving, from a client device, a query. The query generally comprises one or more data items and wherein at least one of the one or more data items comprises sensitive data. A query processor obtains, from a key management server, a cryptographic key to use to encrypt the record based on data derived from the one or more data items comprising sensitive data and a type of the sensitive data. The query processor generates an encrypted query based on the query and the obtained cryptographic key and executes the encrypted query against the logically sharded database.

20 Claims, 10 Drawing Sheets

(56) References Cited

U.S. PATENT DOCUMENTS

| | | | |
|---|---|---|---|
| 2013/0266138 A1* | 10/2013 | Mantri | H04L 9/0869 380/44 |
| 2013/0326228 A1* | 12/2013 | Utin | G06F 21/31 713/183 |
| 2014/0003608 A1* | 1/2014 | MacMillan | H04L 9/0861 380/279 |
| 2014/0006786 A1* | 1/2014 | Campagna | H04L 9/0869 713/171 |
| 2014/0052999 A1* | 2/2014 | Aissi | G06F 21/64 713/189 |
| 2015/0095642 A1 | 4/2015 | Spalka | |
| 2015/0156018 A1* | 6/2015 | Ohya | H04L 9/0662 380/46 |
| 2017/0262638 A1 | 9/2017 | Horowitz et al. | |
| 2017/0277773 A1* | 9/2017 | Iasi | G06F 17/2205 |
| 2019/0149320 A1* | 5/2019 | Keselman | H04L 9/083 380/279 |

OTHER PUBLICATIONS

PCT/US2017/062077, International Search Report dated Jul. 19, 2018, 12 pages.

\* cited by examiner

| SSN LAST 4 | KEY |
| --- | --- |
| 1234 | FBBA85FACA6A37C076644B3F1721EF2D |
| 5678 | 8FC01F504A5B3632924F084988C9904A |
| 1357 | EEFF066FAB445358BDBF5DBE492C090C |
| 2468 | 2D199D52D7D55D4AFE9C82FADC62F1EC |

210

| SSN LAST 4 | ENCRYPTED SSN |
| --- | --- |
| 1234 | OwmjWOk5Xq/NJMzGPQCtxNJ9Cpc5MoDiyTpm3wxbidob23CllcxT3RYowRMLTutWCmbCindJDiiz/lf8lSkkVleRLtHIDsWrATqpm8WwSXMfjiRfWMsrU1Vi+Cf+Qji60tw9k7hecg0ofFeXgRhGZw== |
| 5678 | /0WXmFvSCPUFNUo4NbhaOotqwJofH1XpzhACVbWgiRHg2YDE7FZoyVrZFHJPjtXrPcgqen30K2pd/k/7O3mJFXileCqHlTDZusv40wPJPc+ouv26FXU26qDORrpL6rq3qxllyhHF2Op45k/whnPIDw== |
| 1357 | K41iB8WYfdZoq3LiXJ1W2ewHWgiAxtkZv09s/Zi9nFQaknpmAINOlaQob1BNyj6fo8g0Xst8Kc/McKU7+ZbgVLZUWxRLmCigrEYhG6X8nY/TOCgOOByy3cT9uwrEIGY/TTldfQMSctGqtW/DT/bEiw== |
| 2468 | iVTTxYZe6IBeYn4Rfr77wy28dJotOCuMMm4o1NTS0RS1jZLJ5en9EEMTiW5WdBvCIbw3pWoKfhpeQgKA2hXJ3isFKcRSRNZ8UDjE2+7Ld0E6VBFxGb/v/uPgh23nFbA5ji7RwyccW+m410KfutHZ7A== |
| 1234 | Yrbqz20QNZIWmlNX1xjZhsAk418LDPMZftGYd3XnGrmGM3s/1++C0FswFHyueKm4E/KcspBwoPDnRKxbnEqt7DwFIK6KZTYtXHyRdqFAs/bf9uickAdbwGrIcglwWekOHryxWchfpSrpW23EZHZINg== |
| 5678 | 03UzK4LsgFlkfqDBGpPviryc52DFXYUg+peO7y12GkZ4i32KqNnPtut3xUyLI2iuHFlrLHoFsZkh3UJ7WR78iDoLwwPInEc4NYRQ6bH2/LYqjMPrLqcqDhcDfhdGcv7SJwcgYLcxqdM076dLcsRAIA== |
| 1357 | 6teuMemGX3Xu98uBLyxO4878Vs5I1WYDgF/HCgbYqY05GTdKKZEKcsIui41jwRyHa1XbLxnveaX1g6x/HO5LTWHOxJFlnRmY/+ohWtwsEvIaNZj0pekfIONFI/VmYlOnJmpTbKtNtYhXEHNW0D/Mw== |
| 2468 | s0kmWQKYGGhDTfSm9q/+6u0RHxA8WNEkcAN2KldY++DcetB8YxBeNyHKM0gGv9QTU+510Sx3FNMS6nKfNWR2qGB/3bAYOYADBUA+0emJ527fehAb+EmdYFmUM9WZO8EWRdyWqdytUM+D712veiDDYA== |
| 1234 | /cSxpksaVtu+BLKVKiSID2b50eCxTqbwlfrimvKH50Y2qTPXuGmS4ywl4nViQKNAcyPmaswqZcuztkehp8XvA2RK+ivtTD9Oz5TXQPvmSj3OLf6XRbCdgZS87RanmfuFyGHpZC8NBN2ZyBhqzOcdJg== |
| 5678 | allt4P7SOj5s5cNGGUqPMd+3hbHXKBJBDurpC4N5a+431iGeMjaui/S8dkrC99MUevt8e6QaWYR2eR0Pn2ZSnTjd6gMcjOyIal0YSHvd1ANwueGL5d7MI+PKEqXBqvr3o66Z/pm0josTqt7s46QyT3w== |
| 1357 | I8Qx3rlH3ZZDOQFsP+EEIfCgN0GfJiIviN3Z3fO2Lrkz3AZzWS0G5jaSyhpJLzzA+rpVf6SFpsgCVtV3n9qJbfTBVVhIroEhG0jJtc5Yh6gYbmiU8lv/AQyPQGxfBxlGHVhAX+K0XVsxTVNHtM3iwQ== |
| 2468 | vxGisjAcfWyc8tmMjha2006beMRdJZouZptPER/uwZxy2913+n0THfCc4x9cLDuAv29BqnTBm/5xzISX0g7PR7mcWWzGvBAIY80FGm9TeiMJ0abHX+UyflUyqmB/dRHyaUkjKBQY5CGySAlaRDup5w== |

PROCESSING DATA QUERIES IN A LOGICALLY SHARDED DATA STORE

BACKGROUND

Field

Embodiments presented herein generally relate to data security, and more specifically to generating and determining cryptographic keys for encrypting and decrypting data in a data storage system.

Description of the Related Art

Data stores, such as non-relational databases or relational databases, are generally used to store large amounts of data for subsequent processing. As the amount of data to be stored in these data stores increases, the risk of losing data through storage system failures, attacks from malware, and other threats also increases. To reduce the risk of data loss, data stores can be partitioned into a number of data shards, and each data shard may be stored on an independent computing system. Each shard generally includes a plurality of data records (e.g., rows of a database). Because each shard is generally stored on an independent computing system, a compromise of one computing system generally results in the exposure of less data than in a scenario where a data store hosting a unitary database is compromised.

In some cases, the data stored in data stores or data shards may be data that, for a variety of reasons, is considered private data and is required to be encrypted. This data includes, for example, national identification numbers (e.g., Social Security Numbers in the United States, National Insurance Numbers in the United Kingdom, and similar identifiers in other countries), agency filing identification numbers, birth date information, passwords, and other data that if left unencrypted can be stolen and used maliciously. To protect the data, the data in the data stores is generally encrypted using one or more encryption keys, which encodes the data stored in these data stores so that intelligible data is available only to parties having the one or more keys needed to decrypt the data. The encryption may be based on a symmetric key architecture, where the same key is used to encrypt and decrypt data, or an asymmetric key architecture, where one key (typically, a public key) is used to encrypt data and the corresponding key (typically, a private key known by a small number of people) is used to decrypt data.

In some scenarios, where data stores are secured by a single encryption/decryption key, the use of the single encryption/decryption key may present a single point of failure in the security of the data stores. If an unauthorized party is able to obtain the single encryption/decryption key used to encrypt the data stored in the data stores, all of the data in the data store may be accessed, copied, and used for unauthorized purposes (e.g., identity theft). To reduce the amount of data that can be compromised, a different encryption/decryption key can be used to encrypt each data shard. While using a different encryption/decryption key for each data shard may reduce the number of database records that can be exposed when an encryption/decryption key is compromised, maintaining a repository with the appropriate key for each data shard may introduce further points at which the data stores can be compromised. Further, maintaining separate data shards to store data generally entails adding complexity to applications that use sharded data, as the application may need to perform data queries across multiple data shards to obtain usable data.

While data sharding through storing data in different data stores generally limits the amount of data that may be compromised when a single key is compromised, identifying the data store to read data from and write data to may be a resource-intensive process. Thus, there is a need for data storage systems in which encryption keys for different pieces of data can be derived for use in reading data from and writing data to a unified data store.

SUMMARY

One embodiment of the present disclosure includes a method for deriving cryptographic keys for use in encrypting sensitive data included in a data query. The method generally includes receiving, from a querying device, a request for a cryptographic key. The request generally includes data derived from a plaintext value to be encrypted and an indication of a type of the plaintext value to be encrypted. A key deriver generates a cryptographic key based, at least in part, on the data derived from the plaintext value and the type of the plaintext value to be encrypted. The key deriver transmits the generated cryptographic key to the querying device.

Another embodiment of the present disclosure provides a computer-readable storage medium having instructions, which, when executed on a processor, performs an operation for deriving cryptographic keys for use in encrypting sensitive data in a data query. The operation generally includes receiving, from a querying device, a request for a cryptographic key. The request generally includes data derived from a plaintext value to be encrypted and an indication of a type of the plaintext value to be encrypted. A key deriver generates the cryptographic key based, at least in part, on the data derived from the plaintext value and the type of the plaintext value to be encrypted. The key deriver transmits the generated cryptographic key to the querying device.

Still another embodiment of the present disclosure includes a processor and a memory storing a program, which, when executed on the processor, performs an operation for deriving cryptographic keys for use in encrypting sensitive data in a data query. The operation generally includes receiving, from a querying device, a request for a cryptographic key. The request generally includes data derived from a plaintext value to be encrypted and an indication of a type of the plaintext value to be encrypted. A key deriver generates the cryptographic key based, at least in part, on the data derived from the plaintext value and the type of the plaintext value to be encrypted. The key deriver transmits the generated cryptographic key to the querying device.

One embodiment of the present disclosure provides a method for executing queries against a logically sharded database. The method generally includes receiving, from a client device, a query. The query generally comprises one or more data items and wherein at least one of the one or more data items comprises sensitive data. A query processor obtains, from a key management server, a cryptographic key to use to encrypt the record based on data derived from the one or more data items comprising sensitive data and a type of the sensitive data. The query processor generates an encrypted query based on the query and the obtained cryptographic key and executes the encrypted query against the logically sharded database.

Another embodiment of the present disclosure includes a computer-readable medium having instructions stored thereon which, when executed by a processor, performs an operation for executing queries against a logically sharded database. The operation generally includes receiving, from a client device, a query. The query generally comprises one or more data items and wherein at least one of the one or more data items comprises sensitive data. A query processor obtains, from a key management server, a cryptographic key to use to encrypt the record based on data derived from the one or more data items comprising sensitive data and a type of the sensitive data. The query processor generates an encrypted query based on the query and the obtained cryptographic key and executes the encrypted query against the logically sharded database.

Still another embodiment of the present disclosure includes a processor and a memory storing instructions which, when executed by the processor, performs an operation for executing queries against a logically sharded database. The operation generally includes receiving, from a client device, a query. The query generally comprises one or more data items and wherein at least one of the one or more data items comprises sensitive data. A query processor obtains, from a key management server, a cryptographic key to use to encrypt the record based on data derived from the one or more data items comprising sensitive data and a type of the sensitive data. The query processor generates an encrypted query based on the query and the obtained cryptographic key and executes the encrypted query against the logically sharded database.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2 illustrates an exemplary logically sharded database table and keys used to shard the database table, according to one embodiment.

DETAILED DESCRIPTION

Figure 1:
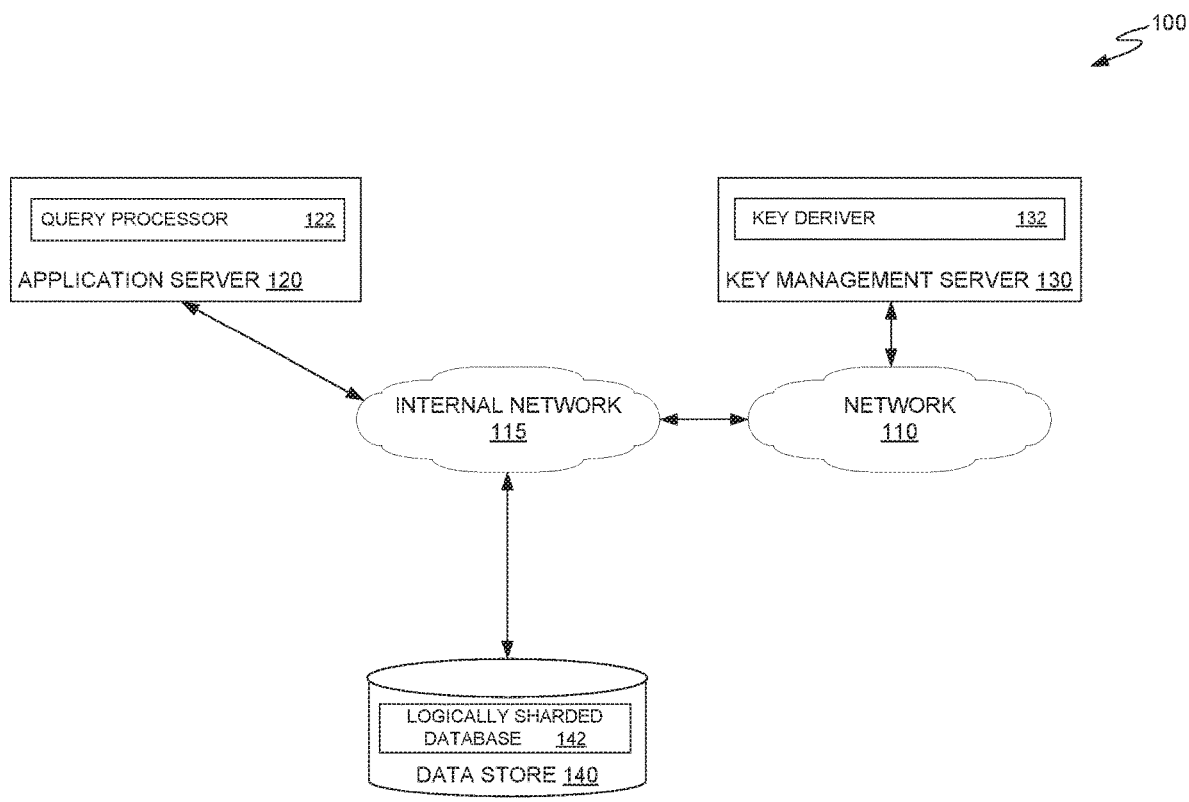
FIG. 1 illustrates an exemplary networked computing environment, according to one embodiment.

Databases generally are used to store large amounts of information in a searchable repository. A database table generally includes a plurality of columns defining different types of data that are included in a single record in the database table. To access this data, a client device performs a query on the database specifying the data to be returned and the search parameters defining what data each record returned in response to the query is required to contain.

In some cases, where databases are used to store sensitive data, such as Social Security numbers, documents with sensitive information, or other personally identifiable information, a simple encryption scheme uses a single encryption key to encrypt the sensitive data. If the encryption key is lost or compromised, all the sensitive data stored in the database may be exposed. To limit the amount of data that is exposed when a key is compromised, databases can be divided into different portions, or shards, with the data stored in each shard being encrypted using a different encryption key. The number of shards may be established to provide an upper bound on the amount of data that would be compromised if another party were to compromise a data shard and its corresponding encryption key.

While data sharding may provide for increased data security by spreading sensitive data across multiple, differently-encrypted databases, searching for data in a sharded database may be a time-consuming process. For example, in a sharded database with 100,000,000 records stored across 10,000 database shards, 10,000 different encryption and search processes may be executed in order to find data in the sharded database. Because cryptographic operations may be computationally expensive processes, executing a large number of encryption operations to perform searches across a sharded database may degrade system performance by adding large amounts of processing time to database search requests.

Some aspects of the present disclosure provide for logical sharding of a database to provide both data security for the data stored in the database and rapid execution of searches against encrypted data in the database. In a logical sharding system, as discussed herein, data is generally encrypted using a deterministic encryption scheme that returns the same ciphertext for a given combination of a plaintext to be encrypted and an encryption key. The encryption keys used for encrypting data stored in the database may also be generated deterministically, as discussed herein, using a combination of data related to the plaintext to be encrypted and a base key associated with a type of the data to be encrypted and stored in the database. Because the same ciphertext is generated for a combination of a plaintext and an encryption key, encrypted data may be stored in a database and may be used as key data in a search operation in a database, which allows for a single encryption operation and single search operation to be performed to execute a search for sensitive data stored in the database. If a key is compromised, only a portion of the data stored in the database may be compromised, as different data records in the database may be encrypted using different encryption keys.

Some aspects of the present disclosure provide remote derivation of cryptographic keys for processing sensitive data in data queries. To remotely derive a cryptographic key for processing sensitive data, a device can derive data from a plaintext to perform a data query on. The derived data may include, for example, the plaintext itself, a cryptographic hash of the plaintext, an encrypted copy of a portion of a cryptographic hash of the plaintext, or some other string deterministically derived from the plaintext. As discussed herein, the derived data may include the data generated by a cryptographic hash function, an encryption algorithm, or other deterministic algorithm, or a truncated portion thereof. The device transmits the data derived from the plaintext to a key derivation service to obtain a cryptographic key to use in encrypting the plaintext. A portion of the data derived from the plaintext can be used in deriving the cryptographic key. The derived cryptographic key is generally provided to a requesting computing system, where sensitive data is encrypted using the derived cryptographic key before the data is committed to a data store. A large number of cryptographic keys can be generated to encrypt data committed to the data store so that only a small portion of the data committed to the one or more data stores would be exposed in the event that a cryptographic key is compromised.

FIG. 1 illustrates an exemplary system for deriving a cryptographic key for use in encrypting data to be stored in one or more data stores, according to an embodiment. As illustrated, system 100 includes an application server 120, key management server 130, and a data stores 140. Application server 120 and data stores 140 may be connected via an internal network 115, and application server 120 generally communicates with key management server through via network 110, which may be an external network.

Application server 120 is included to be representative of a server, cluster of servers, logical computing devices, or any other computing device on which a workload may be executed. Application server 120 generally hosts one or more applications which provide functionality to a client device (not shown), including, but not limited to, handling requests to read data from and write data to a data store 140. As illustrated, application server 120 includes a query processor 122 which generally provides an interface through which application server 120 receives read and write queries from one or more client devices to be executed against data store 140. Typically, query processor 120 receives queries in the form of data to commit to data store 140 or one or more search parameters to use in searching for data in data store 140 as one or more plaintext values (i.e., the actual values to write or search for in data store 140, rather than encrypted or encoded versions of the values to write or search for in data store 140). For plaintext values related to sensitive data, security rules generally dictate that such values cannot be transmitted from application server 120 to data store 140 for execution without being encrypted, as malicious systems may be able to intercept the data transmissions between application server 120 and data store 140. In such a case, sensitive data may be exposed to unauthorized persons. Thus, query processor 122 generally encrypts such data before transmitting the encrypted data to data store 140 for execution.

To obtain a cryptographic key for encrypting data before transmitting a query to data store 140 for execution, query processor 122 derives data from a plaintext value to be stored or used as a search parameter. The data derived from the plaintext value to be stored or used as a search parameter may include, for example, a cryptographic hash of the plaintext value, an encrypted version of a portion of a cryptographic hash of the plaintext value, or some other string that may be deterministically derived from the plaintext value (i.e., data that results in the same string being returned each time the string is derived from the plaintext value). A cryptographic hash generally results in the generation of a fixed-size string representing a given input (e.g., a plaintext value representing sensitive data provided by a user of client device 120). Because cryptographic hash functions are designed to be impossible, or at the very least infeasible, to reverse, unauthorized parties are generally unable to extract the plaintext value from which a cryptographic hash is generated. The cryptographic hash may be generated, for example, using the SHA-256 cryptographic hashing algorithm, the SHA-3 hashing algorithm, or other algorithms that generate a pseudorandom (or random-looking), unique value from a given plaintext value.

Query processor 122 requests a cryptographic key from key management server 130 by transmitting the data derived from the plaintext value or a truncated version of the data derived from the plaintext value to key management server 130, where key management server 130 derives an encryption key to be used in encrypting data at application server 120, as discussed in further detail herein. Query processor 122 can transmit the data derived from the plaintext value to key management server 130 where selection of a portion of the data derived from the plaintext value from which a key is derived is managed by key management server 130. Where selection of the truncated portion of the data derived from the plaintext value is managed by application server 120 (e.g., where application server 120 initiates key rotation by changing the substring from which key management server 130 derives a key), the truncated version of the derived data may be transmitted to key management server 130. As discussed in further detail herein, query processor 122 can generate a truncated version of the derived data by selecting n characters from an arbitrarily selected starting location in the derived data. To rotate keys used to encrypt and decrypt data in a logically sharded data store, query processor 122, in some embodiments, may select a new starting location in the derived data to generate a new truncated version of the derived data with a length of n. The value of n may, in some embodiments, be selected to limit the number of records that may be exposed in the event of a key compromise to less than a threshold number or amount. Application server 120 receives the derived encryption key from key management server 130, and query processor 122 encrypts the sensitive data using the derived encryption key. Query processor 122 may subsequently generate one or more data queries to write sensitive data to logically sharded database 142 in data store 140 or read data from logically sharded database 142 in data store 140 using the encrypted data as a search parameter.

To execute read queries, query processor 122 generates a query including information indicating the data to be retrieved from data store 140 and one or more conditions that the data retrieved from data store 140 is expected to satisfy. The conditions may indicate, for example, that the retrieved data should include records including a specified string in a specified field. Query processor 122 may transmit the generated query to data store 140, which performs a search for records matching the conditions in the generated query, and query processor generally receives a response from data store 140 including the matching data. In some cases, where the data records include encrypted data, query processor 122 may retransmit the data to a client device without decrypting the encrypted data. By transmitting encrypted data to a client device, query processor 122 can protect sensitive data against information leakage or interception, as the attacks on the application server may not be able to retrieve decrypted sensitive data while the sensitive data is being re-encrypted using another key. In some cases, where a key rotation procedure is executing on data stored in data store 140, the read query may include parameters encrypted using a previous key (i.e., the key that is being removed from use) and the new key (i.e., the key replacing the previous key) to enable query processor 122 to retrieve the requested data from logically sharded database 142 regardless of the key that is used to encrypt sensitive data.

For write queries, query processor 122 generates a query with parameters including data to write to data store 140. As discussed, the parameters included in a write query may include encrypted data for data fields in the data store 140 that store sensitive data. Query processor 122 generally encrypts sensitive data to be stored using a derived encryption key generated from data derived from the sensitive data values, as discussed above. When query processor 122 transmits the generated write query to data store 140 for execution, query processor 122 generally causes unencrypted data to be written to logically sharded database 142 as plaintext (unencrypted) values. For sensitive data encrypted using a derived key, query processor 122 can cause the sensitive data to be written to logically sharded database 142, for example, as a concatenation of a key name and the encrypted value or otherwise in a manner that links the key name with the encrypted value. By writing both the key name and the encrypted value, query processor 122 can write additional data to the logically sharded database 142 that can be used to identify a key (or the properties from which a cryptographic key can be derived) used to encrypt data in a particular data record.

In some cases, cryptographic keys generated by key deriver 132 may be cached at application server 120 to accelerate the process of obtaining a cryptographic key for use in encrypting data included in data queries. A cache of derived encryption keys maintained at application server 120 may, for example, be stored as an association between the derived data used to generate the cryptographic key, the data type associated with the cryptographic key, and the derived key. In some cases, application server uses the data derived from a plaintext value, or a truncated version of the data derived from the plaintext value, and the data type associated with the requested cryptographic key, as a key for searching a lookup table including a plurality of deterministically derived cryptographic keys that have previously been obtained from key management service 130. If no key is cached for the combination of the derived data and the data type associated with the cryptographic key, application server 120 can request the cryptographic key from key management server 130, as discussed in further detail below. If, however, a key is cached for the combination of the truncated derived data and the data type associated with the cryptographic key, application server 120 can use the key to encrypt a data query for execution against data store 140 without requesting a cryptographic key from key management server 130, which may accelerate the process of obtaining a cryptographic key from key management server 130 by eliminating network latency involved in transmitting a request for a cryptographic key to key management server 130 and receiving the cryptographic key from key management server 130 via network 110.

Key management server 130 generally receives key derivation requests from query processor 122 executing on application server 120 and returns one or more derived keys based on data derived from plaintext values provide to key management server 130. As illustrated, key management server 130 includes a key deriver 132.

Key deriver 132 generally receives data derived from a plaintext value from application 122 and uses the received data derived from the plaintext value to derive an encryption key for the data represented by the data derived from the plaintext value, according to an embodiment. As discussed, the data derived from the plaintext value may include, for example, a cryptographic hash of the plaintext value, a deterministically encrypted version of at least a portion of the cryptographic hash of the plaintext value, or any other string that can be deterministically generated from the plaintext value and from which the original plaintext value cannot be extracted. In some cases, to balance the number of generated keys with practical considerations of providing for ease of key derivation, limiting potential data loss exposure to a small percentage of data stored in data store 140, and increasing the security of the data by making it harder to determine the type of data the derived data is associated with, key deriver 132 can use a truncated portion of the data derived from a plaintext value as a basis for deriving an encryption key for use by application 122 to encrypt plaintext values to be included in a data query. For example, key deriver 132 can extract n characters from a portion of the derived data from which to derive an encryption key. For a cryptographic hash or other derived data generated as a hexadecimal string (i.e., a string where valid characters are 0-9 and A-F), the use of n characters generally results a maximum key space of $16^n$ cryptographic keys for any given cryptographic salt. Because the data derived from a plaintext value used to derive an encryption key may be based on the same or similar functions resulting in output of the same length (e.g., a 256-bit output from a SHA-256 cryptographic hash of a plaintext value), key deriver 132 can use a subset of characters from any location in the derived data as the basis from which key deriver 132 derives an encryption key for use by application server 120.

Using the data derived from a plaintext value (or a truncated portion of the derived data) received from application server 120 or generated by key deriver 132, as discussed above, key deriver 132 can determine the cryptographic key to use for encrypting a plaintext value based on the type of the plaintext value to be encrypted. To generate a cryptographic key, key deriver 132 can provide the data derived from the plaintext vaue or truncated portion of the derived data into a key generation function, along with a cryptographic salt value (or base key value) associated with the type of the plaintext value to be encrypted. The cryptographic salt value may be an additional value that key deriver 132 uses to calculate a cryptographic key for application 122 to use in encrypting data and may be associated with a type of the plaintext value that is to be encrypted. To increase data security, different cryptographic salt value can be used for generating cryptographic keys used to encrypt national identification numbers, date of birth information, and other sensitive data so that compromising one key set may not result in a security breach of other sensitive data. Generally, the cryptographic salt value is kept secret on key management server 130 to minimize the risk of exposing a portion of the data used to generate cryptographic keys to outsiders, and thus to minimize the risk of compromising the keys used to encrypt data stored in data store 140. In some embodiments, when it is determined that a cryptographic key has been compromised, key management server 130 can select a new cryptographic salt value (or base key value) to be used in generating new cryptographic keys. During a key rotation procedure, key deriver 132 can generate a first cryptographic key based on the old cryptographic salt value (e.g., the cryptographic salt value being replaced) and a second cryptographic key based on the new cryptographic salt value (e.g., the replacement cryptographic salt value) until application server 120 indicates to key management server 130 that a key rotation procedure has been completed (i.e., that data encrypted using keys generated from the old cryptographic salt value (or base key value) has been re-encrypted using keys generated from the new cryptographic salt value).

In some embodiments, key deriver 132 may derive cryptographic keys for use in encrypting and decrypting non-searchable data. To derive a key for use in encrypting and decrypting non-searchable data, key deriver 132 can derive a cryptographic key based on information about a type of data to be encrypted or decrypted. Each type of data may be associated with its own base cryptographic key, which may be defined a priori or may be derived from information about the type of the data to be encrypted, such as a cryptographic hash of the name of a database field, an encrypted form of the name of a database field, or other data derived from information about the type of the data to be encrypted. Using a deterministic key derivation algorithm, as discussed above, key deriver 132 generates a cryptographic key for the type of data to be encrypted or decrypted and provides the cryptographic key to application server 120 via network 110 for use in encrypting data included in a query or decrypting data returned as a response to a database query, as discussed above.

After key deriver 132 calculates the cryptographic key for application 122 to use in encrypting data, key deriver 132 transmits the key to application server 120 via network 110. To prevent information leakage, the derived cryptographic key may be transmitted to application server 120 in an encrypted communication using cryptographic keys agreed upon by the application server 120 and key management server 130 at a previous point in time. For example, cryptographic keys for securing communications between application server 120 and key management server 130 may be agreed upon when application server 120 initiates a communication session with key management server 130. These cryptographic keys may expire over time, and application server 120 generally establishes a new cryptographic key to use for subsequent communications with key management server 130 when a previous cryptographic key expires or when application server 120 initiates a new communication session with key management server 130.

In some cases, if key deriver 132 determines that a cryptographic key has been compromised, key deriver 132 can enforce a key rotation regime related to the data derived from a plaintext value provided as input into key deriver 132 to change the cryptographic keys used to secure sensitive data. In one example, the key rotation regime may change the characters from the derived data used to generate the cryptographic key. For example, if an initial cryptographic key was generated based on characters 1 through n of the data derived from a plaintext value, a new cryptographic key may be generated based on characters 2 through n+1 of the derived data using the same cryptographic salt for the type of data to be encrypted. In another example, the key rotation regime may use the same n characters of the derived data to generate a new cryptographic key, but use a different randomly-generated cryptographic salt to generate cryptographic keys for the type of data to be encrypted. While the foregoing is described in the scope of adjusting the truncation of data derived from a plaintext value at a key management server 130, it should be recognized that similar actions may be performed at an application server 120 to select a particular portion of data derived from a plaintext value for use in requesting derived cryptographic keys from a key management server 130.

Data store 140 is illustrative of a networked data store in which user data is stored and that application server 120 can write data to or read data from. As illustrated, data store 140 generally includes a logically sharded database 142. Within logically sharded database 142, different records may be encrypted using different encryption keys. Because data may be stored in a single logically sharded database, read and write operations may be executed without a query processor 122 needing to identify a database against which a query should be executed before executing the query. Additionally, because records may be stored using different encryption keys, compromising a single key may only expose a subset of the data stored in logically sharded database 142. In some cases, the data records stored in logically sharded database 142 may include unencrypted data, such as a user's name or address, and sensitive data stored as a concatenation of a key name and an encrypted value. As discussed, the encrypted value may be generated by encrypting a plaintext value using a key generated from data derived from the plaintext value.

FIG. 2 illustrates an exemplary logically sharded database table and keys used to logically shard the database table, according to an embodiment. As illustrated, the logically sharded database table 220 stores Social Security Numbers in an encrypted form, and the contents of the table are logically sharded based on the last four digits of a Social Security Number. By logically sharding the database table 220 based on the last four digits of a Social Security Number, the blast radius of any single compromised key may be limited to a maximum of 10,000 records. Further, by logically sharding the database table 220, an application executing on a client device or application server 120 need not maintain logic for determining which database table data should be written to or read from. Unlike a physically sharded database, where data is stored in different databases, a logically sharded database including a logically sharded database table 220 stores all the records associated with a table in a single location but uses different, statically-determined cryptographic keys to shard the records stored in a table based on the content of the records.

Key table 210 is illustrated herein for conceptual reasons but generally is not be stored in a database for security reasons (e.g., to prevent malicious applications from exfiltrating the data cryptographic keys to an unauthorized user) and because a deterministic algorithm, such as a cryptographic hash algorithm or deterministic encryption algorithm, results in the generation of the same output data from a given input. Key table 210 illustrates an association between a shard identifier (e.g., the last four digits of a Social Security Number) and the associated key derived from the shard identifier. Each cryptographic key illustrated in key table 210 may be generated using a static key deriver which generates the same key value for a given input. By generating the same key value for a given input, the same key may be generated for each record in a database having the same shard identifier, which may be a subset of numbers in a Social Security Number, a subset of characters in a cryptographic hash of a data entry or other data derived from the data entry, or other shared identifier. As illustrated, for Social Security Numbers having a last four digits of 1234, the cryptographic key generated using the static key deriver is FBBA85FACA6A37C076644B3F1721EF2D. The cryptographic key for Social Security Numbers having a last four digits of 5678 is 8FC01F504A5B3632924F084988C9904A. The cryptographic key for Social Security Numbers having a last four digits of 1357 is EEFF066FAB445358BDBF5DBE492C090C. Finally, the cryptographic key for Social Security Numbers having a last four digits of 2468 is 2D199D52D7D55D4AFE9C82FADC62F1EC.

As discussed above, database table 220 is logically sharded using the cryptographic keys illustrated in key table 210. Entries in database table 220 are encrypted using the deterministic keys illustrated in key table 210 such that all data entries are stored in the same database table, but only a subset of the records in database table 220 are decryptable using any given database key. For example, as illustrated in database table 220, the database records having a last four Social Security Number digits of 1234 are decryptable using the cryptographic key FBBA85FACA6A37C076644B3F1721EF2D but will generate unusable data if a user attempts to decrypt these records using any other cryptographic key illustrated in key table 210. Likewise, the records having a last four Social Security Number digits of 5678 may only be decrypted using the cryptographic key 8FC01F504A5B3632924F084988C9904A; the records having a last four Social Security Number digits of 1357 may only be decrypted using the cryptographic key EEFF066FAB445358BDBF5DBE492C090C; and the records having a last four Social Security Number digits of 2468 may only be decrypted using the cryptographic key 2D199D52D7D55D4AFE9C82FADC62F1EC.

Figure 3:
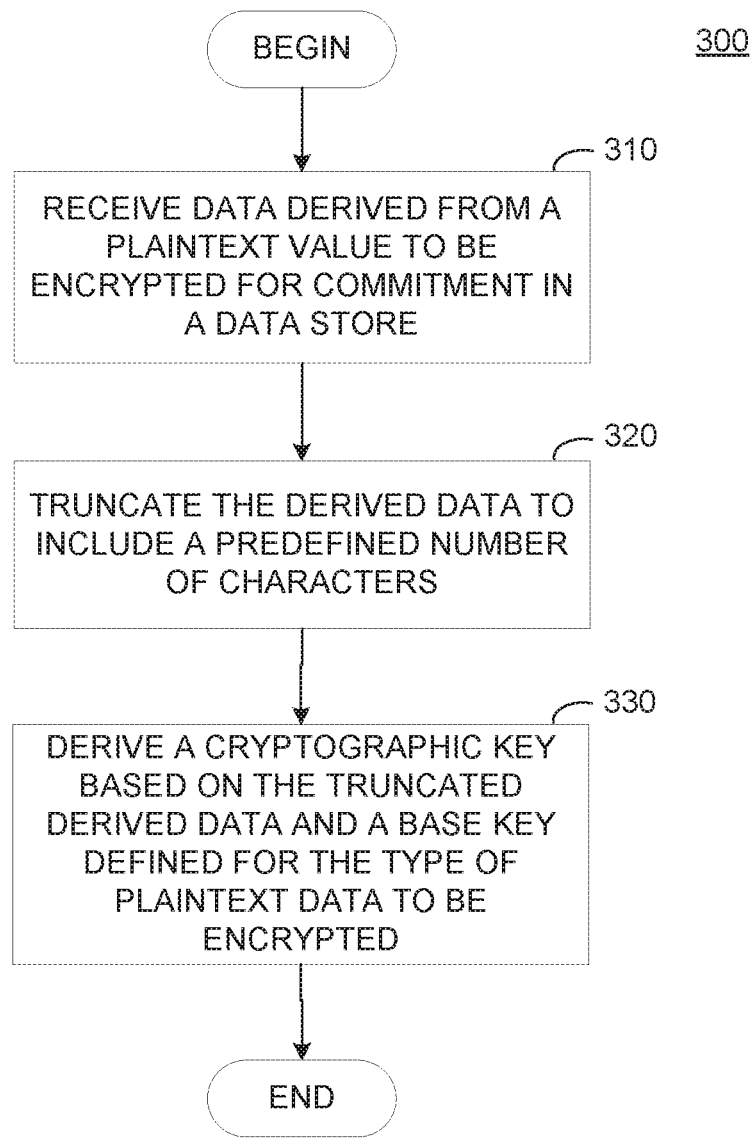
FIG. 3 illustrates example operations that may be performed to deterministically derive a cryptographic key for logically sharding data in a database based on data to be stored in the database, according to one embodiment.

FIG. 3 illustrates exemplary operations that may be performed by a key derivation server for deterministically generating cryptographic keys for logically sharding data stored in a database, according to an embodiment. As illustrated, operations 300 may begin at step 310, where key management server 130 receives data derived from a plaintext value to be encrypted. As discussed, the data derived from the plaintext value may be a string representing the plaintext value but from which the plaintext value cannot be retrieved. In some cases, if key management server 130 receives the data derived from the plaintext value as a hexadecimal string, key management server 130 may proceed to step 320 without converting the received data derived from the plaintext value into a different format. If, however, key management server 130 receives the data derived from the plaintext value as an ASCII string, a binary stream, or any other non-hexadecimal format, key management server 130 can convert the received cryptographic hash into a hexadecimal string.

At step 320, key management server 130 truncates the data derived from the plaintext value to include a predefined number of characters. As discussed above, the data derived from the plaintext value may be truncated to a number of characters so that a common cryptographic key can be re-used for a number of different plaintext values. Rules for truncating the data derived from the plaintext value may be established on a per-data-type basis, and the rules may indicate, for example, a number of characters to be included in the truncated data derived from the plaintext value and a position in the data derived from the plaintext value from which the number of characters are to be extracted. In some cases, as keys become compromised, the position in the data derived from the plaintext value from which the truncated data begins may change in order to decrease the risk of compromising additional data stored in the one or more data stores 140.

At step 330, key management server 130 derives a cryptographic key based on the truncated data derived from the plaintext value and a salt value for the type of plaintext data to be encrypted. Key management server 130, in some cases, can concatenate the truncated hash and salt value into a single string and use the concatenated string as an input to generate the cryptographic key. In other cases, key management server 130 can interleave the truncated data and salt value to generate a string from which the cryptographic key can be generated. Based on the combination of the truncated data derived from the plaintext value and salt value, key management server 130 can generate a cryptographic key using a one-way function. When key management server 130 generates the cryptographic key, key management server 130 transmits the encryption key to client device 120 for use in encrypting sensitive data to be included in one or more data queries, as discussed above.

Figure 4:
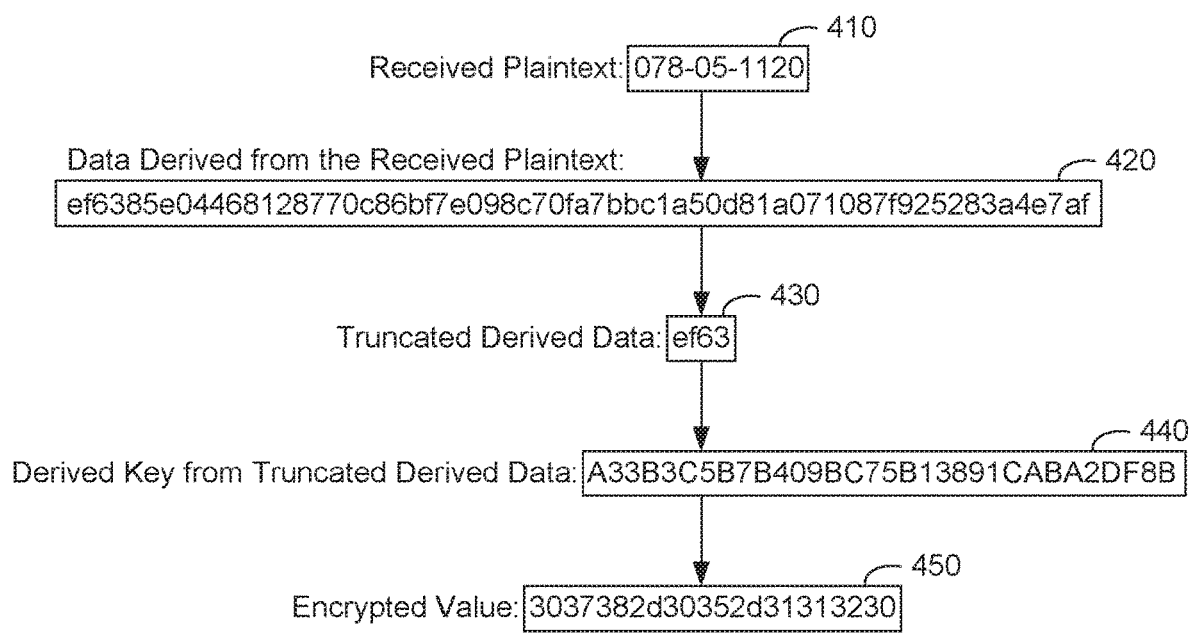
FIG. 4 illustrates an exemplary derivation of a cryptographic key from plaintext data, according to one embodiment.

FIG. 4 illustrates an example derivation 400 of a cryptographic key from a plaintext value to be encrypted, according to an embodiment. As illustrated, an application server 120 receives plaintext value 410 to perform a data query on. As illustrated, the plaintext value is a Social Security Number having the value of "078-05-1120." Because this plaintext value is data that should not be sent in the clear from application server 120 to data store 140, application server 120 requests that data store 140 provide a key for application server 120 to use to encrypt plaintext value 410 before transmitting a data query to data store 140 for execution.

To request a key from data store 140, application server 120 generates a data 420 derived from plaintext value 410 for transmission to key management server 130. As illustrated, data 420 is a cryptographic hash of plaintext value 410; however, as discussed above, data 420 may be any string that can be deterministically derived from plaintext value 410 and from which plaintext value 410 cannot be extracted. Where data 420 is a cryptographic hash, data 420 can be generated using a variety of hashing algorithms, such as SHA-256, SHA-1, MD5, or other hashing algorithms. As illustrated, performing a cryptographic hash on plaintext value 410 results in a value of EF6385E04468128770C86BF7E098C70FA7BBC1A50D8 1A071087F925283A4E7AF for data 420. In another example, the cryptographic hash may be truncated and encrypted using a deterministic encryption algorithm to generate data 420. For example, data 420 may be generated as an encrypted version of the first n characters of the cryptographic hash, encrypted using a unique key for the type of the plaintext value 410 and a cryptographic salt. In some aspects, application server 120 transmits a request for a cryptographic key to key management server 130 including data 420 and an indication of the type of data that a derived cryptographic key will be used to encrypt.

In some cases, where key management server 130 receives a data 420 in an untruncated format, key management server 130 generates truncated data 430 from which a cryptographic key is derived. In some aspects, as discussed above, application server 120 may generate truncated data 430 and transmit the truncated data 430 to key management server 130 in a request for a derived cryptographic key. As discussed, truncated data 430 may be generated by selecting n characters from the received data 420. The number of characters n may be defined to create a key space that minimizes the amount of data that could be lost if a key is compromised. For a hexadecimal character space, which includes 16 characters (the numbers 0-9 and letters A-F), the key space may have a size of $16^n$ for any given cryptographic salt that is appended or interleaved with truncated data 430. The location of the starting character from which the truncated data 430 is generated may be specified on a per-data-type basis. As illustrated in this example, truncated data 430 may be defined as 4 characters of data 420 starting at character 1, resulting in a value of EF63 as the truncated hash.

Based on truncated data 430, key management server 130 derives a cryptographic key 440 for application server 120 to use in encrypting plaintext value 410. In some cases, the derived cryptographic key 440 may be generated from truncated data 430 and a cryptographic salt value or base key associated with the type of data to be encrypted. For example, a first cryptographic salt or base key may be used for generating cryptographic keys for encrypting social security numbers, a second cryptographic salt or base key may be used for generating cryptographic keys for encrypting user date of birth, and so on. In some cases, cryptographic key 440 may be derived using a key derivation function that performs a number of key generation iterations to generate the cryptographic key. As illustrated, based on the value of truncated data 430 and a cryptographic salt value associated with generating cryptographic keys to protect Social Security Numbers, query processor derives a cryptographic key 440 with the value A33B3C5B7B409BC75B13891CABA2DF8B. Key management server 130 transmits cryptographic key 440 to application server 120, and application server 120 uses cryptographic key 440 to encrypt plaintext value 410 before including the encrypted version of plaintext value 410 in a data query to be processed at data store 140. In one example, encrypting plaintext value 410 using cryptographic key 440 using the Advanced Encryption Standard encryption algorithm results in an encrypted value 450 of 3037382d30352d31313230, which may be transmitted in the clear with a minimal risk of exposing plaintext value 410.

Figure 5:
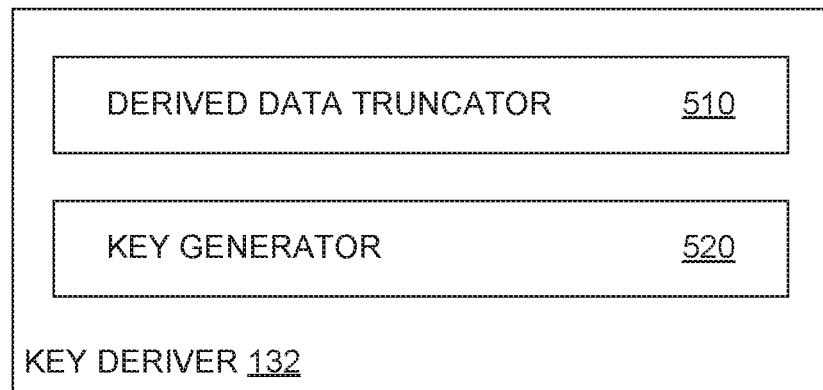
FIG. 5 illustrates an example key deriver that derives a cryptographic key for logically sharding data in a database, according to one embodiment.

FIG. 5 illustrates an example key deriver 132, according to an embodiment. As illustrated, key deriver 132 includes an optional derived data truncator 510 and a key generator 520.

Derived data truncator 510, which may be included in key deriver 132 where truncation of data derived from a plaintext value is performed at key management server 130, generally receives data derived from a plaintext value to be encrypted at client device 120 and an indication of the type of data to be encrypted to generate an input that key generator 520 uses to derive the cryptographic key for the data to be encrypted. As discussed, the received derived data may, in some cases, be a cryptographic hash of the plaintext value, a deterministically encrypted version of the plaintext value or a portion thereof, or some other deterministically generated string representing the plaintext value. The derived data may be formatted, for example, as a hexadecimal string having a predefined length (e.g., a SHA-256 string having a size of 256 bits, or 64 hexadecimal characters in the string). Based on the type of data to be encrypted, derived data truncator 510 can reduce the data derived from the plaintext value to a string of size n. In one example, the type of data to be encrypted may be associated with a starting index of a character in a string such that the truncated derived data comprises n characters, with the first character of the truncated derived data starting at the starting index. The starting index may change over time, as keys are rotated to remove compromised keys from use. Derived data truncator 510 subsequently provides the truncated derived data to key generator 520 to derive a cryptographic key for application server 120 to use in encrypting data included in a data query to be transmitted to data store 140 for execution.

Key generator 520 uses a truncated derived data and a cryptographic salt associated with the type of data to be encrypted to derive the cryptographic key for application server 120 to use in encrypting and decrypting sensitive data. As discussed, the truncated derived data may be provided by application server 120 in a request for a derived cryptographic key or generated by derived data truncator 510. In some embodiments, the truncated derived data and the cryptographic salt associated with the type of data to be encrypted may be concatenated into a single string from which the cryptographic key is generated. For example, if the truncated derived data is the hexadecimal string 0xB16B and the cryptographic salt is the hexadecimal string 0xFE4D92AD5589AFF1, the concatenated string from which the cryptographic key is generated would be the hexadecimal string 0xB16BFE4D92AD5589AFF1. Key generator 520 can use a key derivation function to generate an encryption key from the concatenated string and provide the generated key to application server 120 for use in encrypting sensitive data before transmission to data store 140 for execution. In one example, key generator 520 can use a cryptographic hash function to generate a cryptographic key from the concatenated hexadecimal string. In another example, key generator 520 can use the Password-Based Key Derivation Function 2 (PBKDF2) defined in RFC 2898 to generate a cryptographic key to use for encrypting sensitive data. Using the truncated derived data and cryptographic salt described above, and using 1,000 iterations of the function to generate the cryptographic key, key generator 520 using PBKDF2 may generate a cryptographic key with a hexadecimal value of 0x44B37B4C75122A27443FBD5D66BDA3F112BFC49 DDAB46B825837F7EE199EA9 5B.

Figure 6:
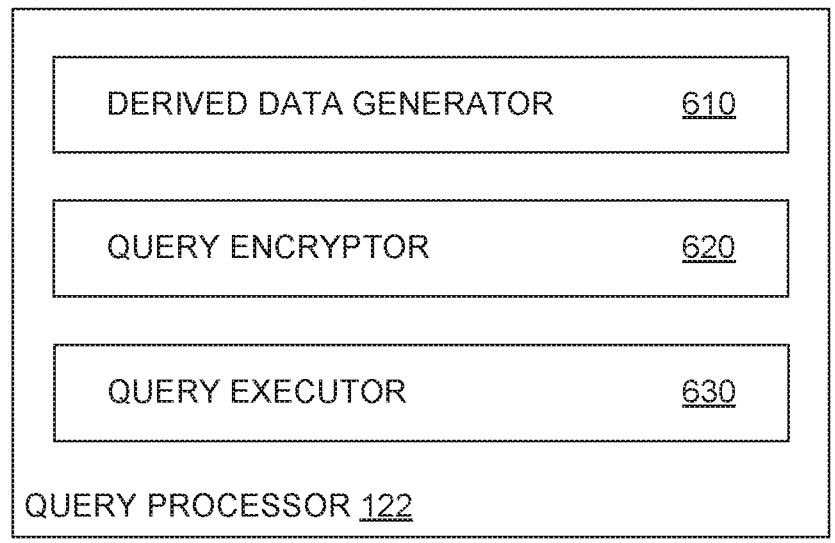
FIG. 6 illustrates an exemplary query processor that obtains a deterministically generated key based on the contents of a database query to use in executing queries against a logically sharded database, according to one embodiment.

FIG. 6 illustrates an exemplary query processor 122, according to an embodiment. As illustrated, query processor 122 includes a derived data generator 610, query encryptor 620, and query executor 630.

Derived data generator 610 generally uses data received from a client device in a request to perform a transaction against data store 140 (i.e., a request to read data from logically sharded database 142 or a request to write data to logically sharded database 142) to generate data derived from the received data and request a derived key from key management server 130 based on the derived data, according to an embodiment. Derived data generator 610 may generate a derived data for a sensitive data field using any appropriate cryptographic hash algorithm, such as SHA-256, using a deterministic encryption algorithm to encrypt the received data or a portion thereof, or using any other deterministic algorithm for generating a string from the received data from which the received data cannot be extracted. In some aspects, after derived data generator 610 generates a cryptographic hash associated with the value input for a sensitive data field, derived data generator 610 can truncate the derived data to a number of characters. As discussed, derived data generator 610 can determine a starting point in the string representation of the data derived from the received data from which the truncated derived data is generated and a number of characters to include in the truncated derived data based on the type of the sensitive data field for which the cryptographic key is requested. Derived data generator 610 requests a cryptographic key from key management server 130 and in response receives the one or more cryptographic keys to use for encrypting the data to be included as parameters to a database query.

Query encryptor 620 generally receives the one or more cryptographic keys from hash generator 610 and generates a query including one or more encrypted parameters, according to an embodiment. If a key rotation procedure is not executing at key management server 130 to change the cryptographic keys used to encrypt and decrypt data in a sensitive data field, query encryptor 620 uses the cryptographic key obtained from hash generator 610 to encrypt one or more parameters in a database search request. For example, to search for a Social Security Number in logically sharded database table 220 illustrated in FIG. 2, query encryptor 620 may receive the cryptographic key FBBA85FACA6A37C076644B3F1721EF2D from key management server 130. To prevent sensitive data from being intercepted in transit between application server 120 and data store 140, query encryptor 620 generates a search query that encrypts the Social Security Number data to be used as a search parameter instead of transmitting the Social Security Number in the clear. Thus, instead of transmitting a search request specifying that a client device is requesting a database record including a Social Security Number of "111-22-1234," query encryptor 620 generates an encrypted query requesting the record including a Social Security Number of "OwmjWOk5Xq/ NJMzGPQCtxNJ9Cpo5MoDiyTpm3wxbidob23CIIoxT3R YowRMLT utWCmbCindJDiiz/ lf81SkkV1eRLtHIDsWrATqpm8WwSXMfjiRfWMsrU1 Vi+Cf+Q ji60tw9k7hecg0ofFeXgRhGZw==."

If, however, a key rotation procedure is executing at key management server 130 for a given base key, query encryptor 620 generally receives two cryptographic keys for use in encrypting parameters included in a search query. A first cryptographic key may be the old cryptographic key generated from a truncated version of the derived data and an old base key, or the cryptographic key being replaced, and the second cryptographic key may be the new cryptographic key generated from a truncated version of the derived data and a new base key. To perform a search query on logically sharded database 142, query encryptor 620 may generate a database query to search for records in the database having a value in an encrypted sensitive data with the requested value encrypted using the first cryptographic key and with the requested value encrypted using the second cryptographic key, as until the key rotation procedure is completed, query processor 122 may not know which cryptographic key a database record is encrypted with. For write queries, query encryptor 620 need not generate multiple write requests; rather, query encryptor 620 may generate a database query with sensitive data encrypted using the second encryption key.

Query executor 630 generally receives an encrypted query from query encryptor 620 and transmits the query to data store 140 for execution. In some cases, where the encrypted query is a read request specifying data to retrieve from data store 140, query executor 630 receives a response from data store 140 including data records satisfying the query or a null result if no records satisfy the query. The data records generally include data encrypted using the one or more encryption keys associated with the value of the data stored in the database, as discussed above. To reduce the risk of data being compromised, query executor 630 may retransmit the encrypted data to an application executing on application server 120 or a client device without decrypting the data, which generally prevents malicious software residing on the application server from intercepting and exfiltrating sensitive data in a useful format. Where the encrypted query is a write request, query executor 630 may receive a response from data store 140 indicating whether the data query successfully executed or failed to successfully execute.

Figure 7:
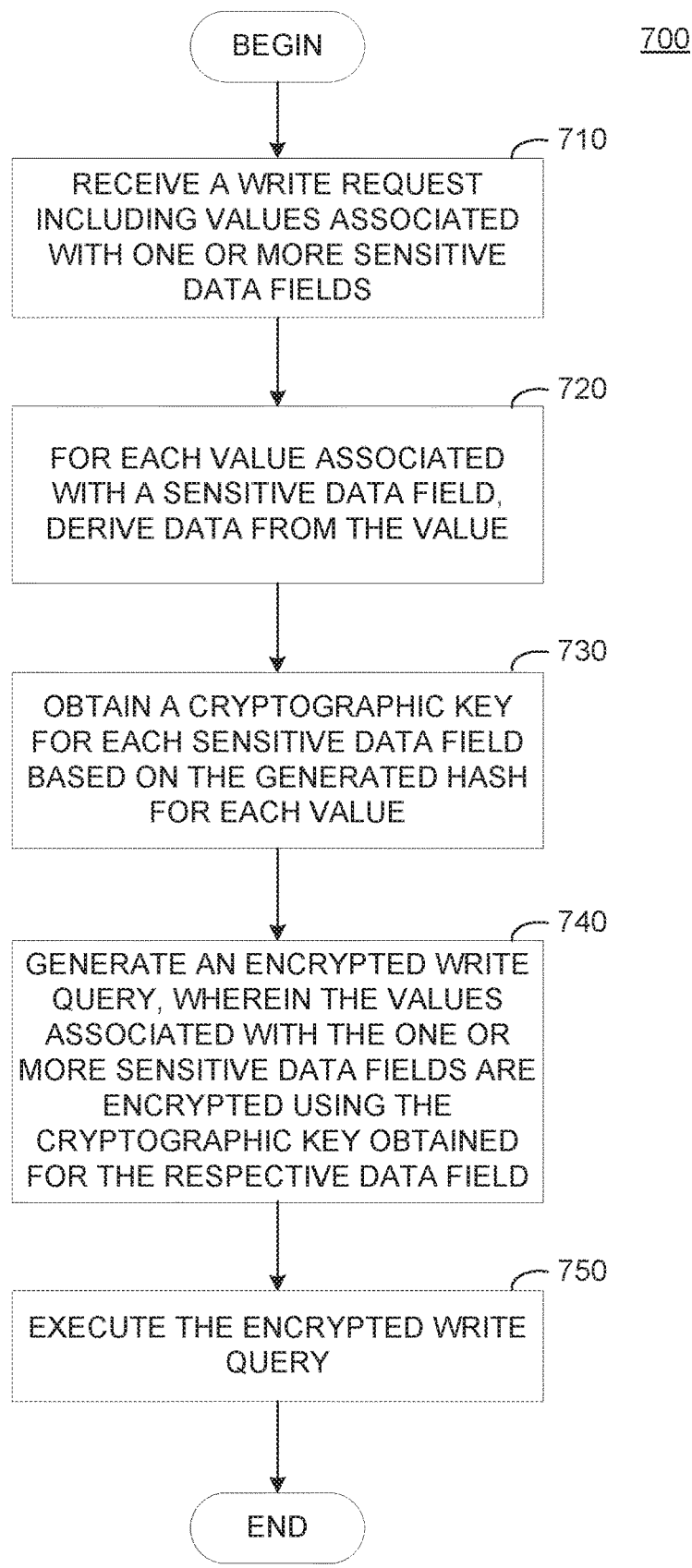
FIG. 7 illustrates example operations that may be performed by a query processor to process write queries against a logically sharded database, according to one embodiment.

FIG. 7 illustrates exemplary operations that may be performed by query processor 122 for performing write queries against a logically sharded database, according to an embodiment. As illustrated, operations 700 begin at step 710, where a query processor receives a write request including values associated with one or more sensitive data fields. The sensitive data may include, for example, personally-identifiable information, such as date of birth, Social Security Numbers (or other national identification number), and the like. In some cases, the sensitive data may include binary large objects (BLOBs) or bitstreams, such as images or document files including sensitive information.

At step 720, for each value associated with a sensitive data field, query processor 122 derives data from the value. As described above, the data derived from each value associated with a sensitive data field may be generated using various techniques. These techniques may include a cryptographic hash algorithm that generates unique hash values for each input plaintext value and for which deriving the plaintext value from which a hash value was generated is computationally impractical, deterministic encryption algorithms that encrypt a cryptographic hash or portion thereof using cryptographic keys and salts associated with a type of the data to be encrypted, or other deterministic algorithms that generate a string representing the plaintext value to be encrypted but for which deriving the plaintext value is computationally impractical.

At step 730, query processor 122 obtains a cryptographic key for each sensitive data field based on the derived data for each value. As discussed, to obtain a cryptographic key for a sensitive data field, query processor 122 can request a cryptographic key from key management server 130 by transmitting data derived from the data to be encrypted and data identifying a type of data to be encrypted to key management server 130. In response, query processor receives a cryptographic key derived from a base key associated with the type of the data to be encrypted and a portion of the data derived from the data to be encrypted. As discussed, the portion of the data derived from the data to be encrypted may comprise n characters selected from the derived data starting at a given location in the derived data, and the number n may be selected based on the number of distinct records that may be present in a system to minimize a maximum number of records that may be compromised if a single key is compromised. In some examples, the cryptographic key may be requested using a static initialization vector and base key associated with a type of the data field to be encrypted such that the same cryptographic key is returned for a given derived data or portion of thereof.

At step 740, query processor 122 generates an encrypted write query. The values associated with the one or more sensitive data fields may be encrypted using the cryptographic key obtained for the respective data field. At step 750, query processor 122 executes the encrypted write query. To execute the encrypted write query, query processor 122 can provide the encrypted data to data store 140 to be committed to data store 140. Because different records are encrypted using different cryptographic keys, committing data to data store 140 generally results in the creation of a logically sharded database where data records are stored in the same database but are sharded based on the cryptographic keys used to encrypt each record. For example, for columns that store sensitive data, the value written to logically sharded database 142 may be a concatenation of the name of a key to be used in decrypting the data and the encrypted version of the data. Using the example described above with respect to FIG. 4, the data stored in a social security number field may be a concatenation of the character sets "ef63" and "3037382d30352d31313230" such that the data stored in a social security number field would be "ef633037382d30352d31313230."

Figure 8:
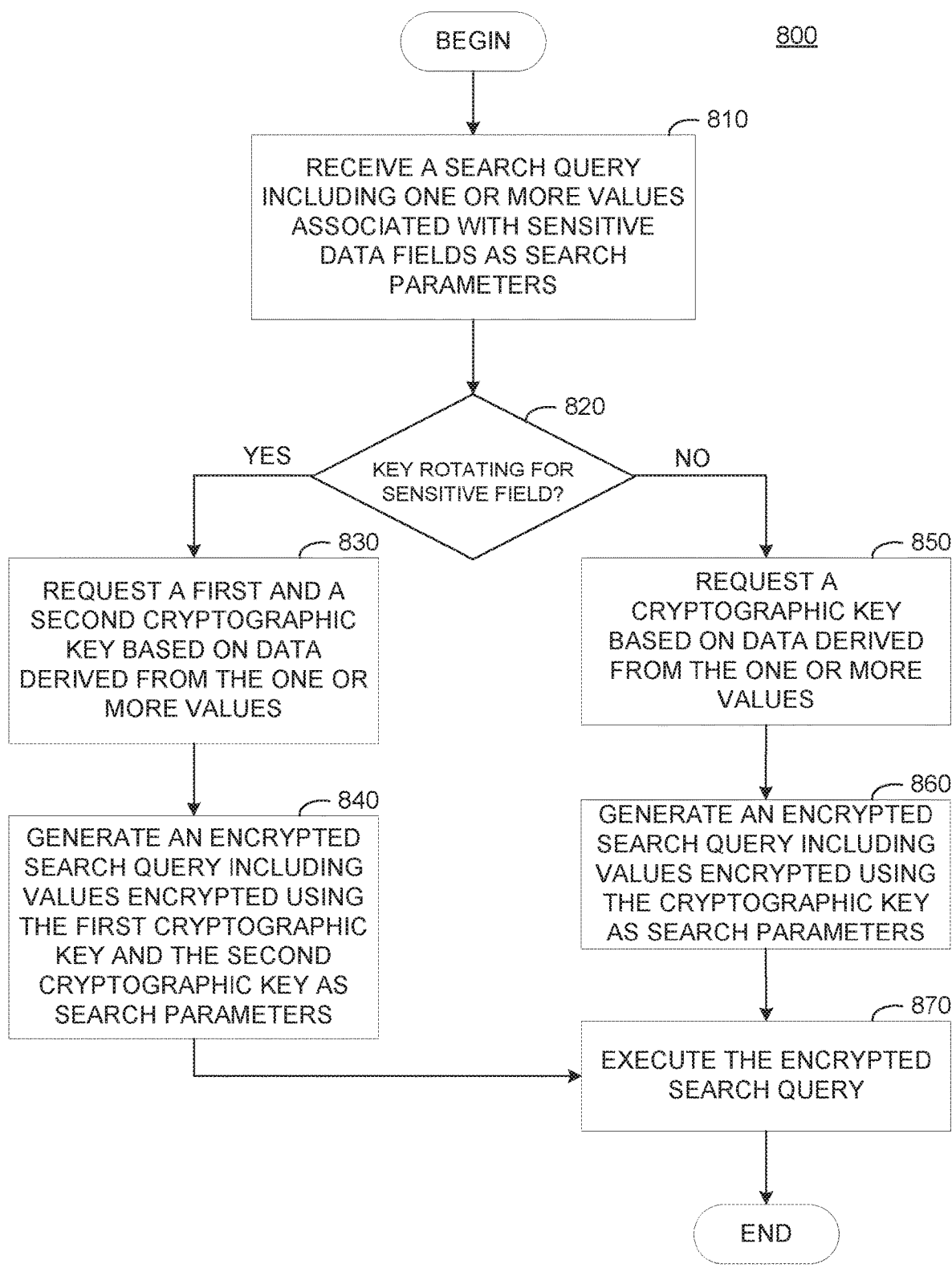
FIG. 8 illustrates example operations that may be performed by a query processor to process read queries against a logically sharded database, according to one embodiment.

FIG. 8 illustrates exemplary operations that may be performed by a query processor 122 for executing search queries (i.e., read requests) against a logically sharded database, according to an embodiment. As illustrated, operations 800 begin at step 810, where query processor 122 receives a search query including one or more values associated with sensitive data fields as search parameters. The sensitive data fields included as search parameters may include, for example, Social Security Numbers (or other national identification numbers), date of birth information, and other data that may be required to be protected against theft.

At step 820, query processor 122 determines whether a key rotation procedure is executing for data stored in a sensitive field. Query processor 122 can determine whether a key rotation procedure is executing for data stored in a sensitive data field based on a flag managed by application server 120. The flag identifying whether a key rotation procedure is executing may be returned in response to a request from query processor 122 including data derived from the data to be encrypted and data identifying the type of the data to be encrypted. As discussed, a key rotation procedure generally entails the re-encryption of sensitive data using a new cryptographic key and may be invoked when a cryptographic key that is presently used to encrypt data is deemed to have been compromised. During a key rotation procedure, some data may be encrypted using the current cryptographic key (i.e., the key to be replaced), and other data may be encrypted using the new cryptographic key (i.e., the key that is to replace the current cryptographic key). Thus, if a key rotation procedure is executing on a sensitive data field, search operations may fail if only one of the two cryptographic keys are used to query for data.

If, at step 820, query processor 122 determines that a key rotation procedure is executing for data stored in a sensitive field, at step 830, query processor 122 requests a first and a second cryptographic key based on the data derived from the one or more values. The first cryptographic key may represent the current cryptographic key used to encrypt data stored in a sensitive field, and the second cryptographic key may represent the new cryptographic key that will replace the current cryptographic key.

At step 840, query processor 122 generates an encrypted search query including values encrypted using the first cryptographic key and the second cryptographic key as search parameters. By including values encrypted using the first cryptographic key and the second cryptographic key, query processor 122 may ensure that records are retrieved from logically sharded database 142 regardless of whether the relevant records are encrypted using the first or the second cryptographic key. Query processor 122 need not determine whether data is encrypted using a particular cryptographic key, which may reduce an amount of time needed to process a read query when key rotation operations are executing in a database.

If, at step 820, query processor 122 determines that a key rotation procedure is not executing for data stored in a sensitive field, at step 850, query processor 122 requests a cryptographic key based on data derived from the one or more values. As discussed above, query processor 122 may request the cryptographic key by transmitting a request to key management server 130 for the cryptographic key associated with a string representing data derived from the data to be encrypted and a type of the data to be encrypted. At step 860, query processor generates an encrypted search query including values encrypted using the cryptographic key as search parameters.

At step 870, query processor 122 executes the encrypted search query. As discussed, when query processor 122 executes the encrypted search query, query processor 122 may receive a result data set including one or more records from logically sharded database 142 or, if no matching records are found, a null data set. If query processor 122 received a pair of cryptographic keys from key management server 130, query processor 122 can examine a key identifier associated with each record in the result data set to determine whether to decrypt a record using the first cryptographic key (i.e., the cryptographic key being rotated out of use) or the second cryptographic key (i.e., the new cryptographic key being rotated into use). If the key identifier associated with a record indicates that the record is encrypted using a first cryptographic key, query processor 122 need not attempt to decrypt the record using the second cryptographic key. Likewise, if the key identifier associated with a record indicates that the record is encrypted using a second cryptographic key, query processor 122 need not attempt to decrypt the record using the first cryptographic key. In some cases, query processor 122 may transmit the result data set to a client device without decrypting the result data set and re-encrypting the results. In some cases, query processor 122 can transmit the result data set to a client device by decrypting the result data set and re-encrypting the result data set using session-specific cryptographic keys established between the client device and the application server 120.

Figure 9:
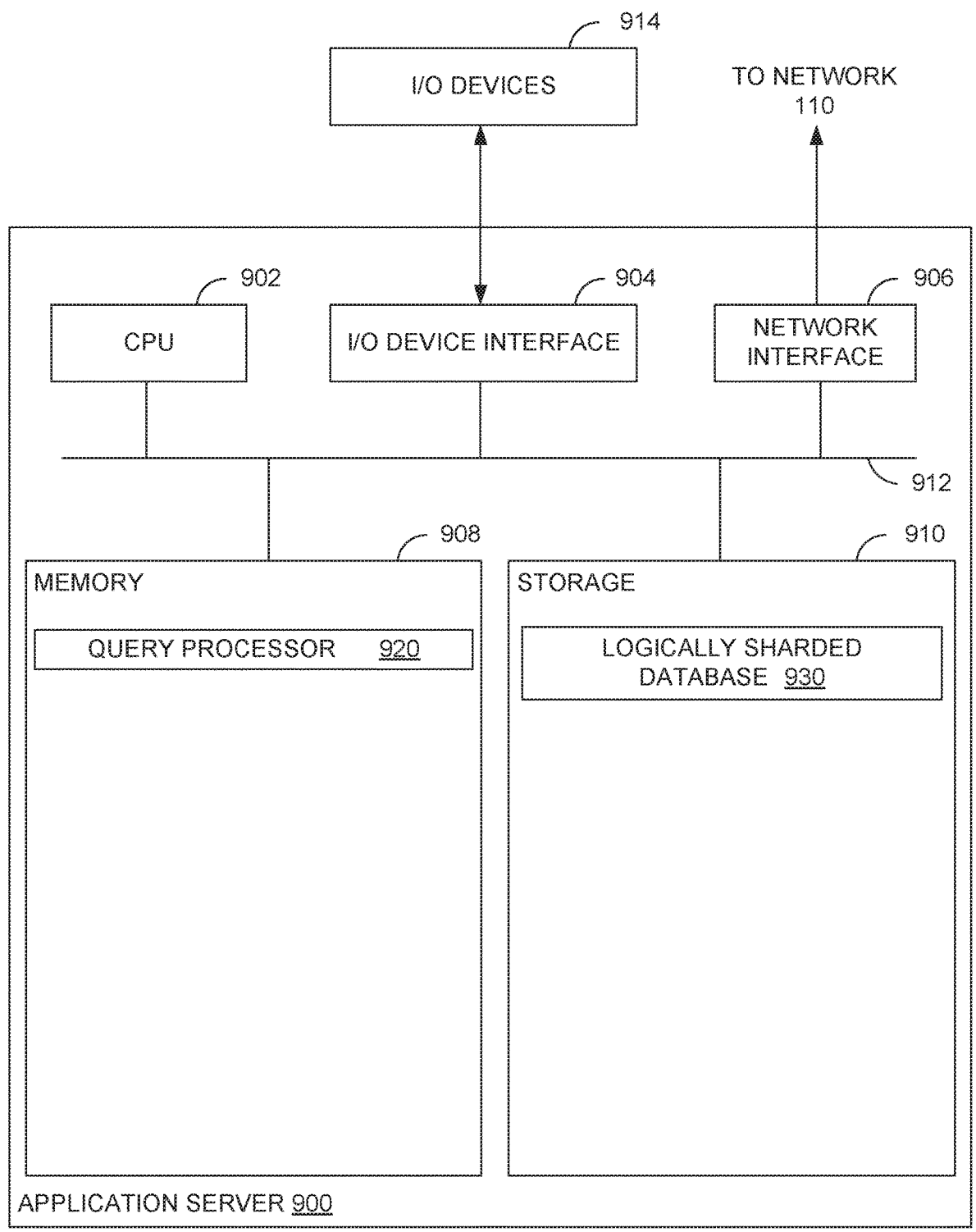
FIG. 9 illustrates an exemplary system for processing data queries against a logically sharded database, according to one embodiment.

FIG. 9 illustrates an exemplary application server 900 that uses derived cryptographic keys to encrypt data to be stored in a logically sharded database and search for encrypted data in a logically sharded database, according to an embodiment. As shown, the system 900 includes, without limitation, a central processing unit (CPU) 902, one or more I/O device interfaces 904 which may allow for the connection of various I/O devices 914 (e.g., keyboards, displays, mouse devices, pen input, etc.) to the system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, memory 908, and storage 910. CPU 902 is included to be representative of a single CPU, multiple CPUs, a single CPU having multiple processing cores, and the like. Additionally, the memory 908 is included to be representative of a random access memory. Furthermore, the storage 910 may be a disk drive, solid state drive, or a collection of storage devices distributed across multiple storage systems. Although shown as a single unit, the storage 1010 may be a combination of fixed and/or removable storage devices, such as fixed disc drives, removable memory cards or optical storage, network attached storage (NAS), or a storage area-network (SAN).

As shown, memory 908 includes a query processor 920. Query processor 920 generally receives data queries from a client device specifying data to be retrieved from logically sharded database 930 or written to logically sharded database 930 in storage 910. In some aspects, query processor 920 can derive data from the specified data to be retrieved from logically sharded database 930 to request a cryptographic key from a key management server 130. As discussed, query processor 920 can request a cryptographic key from key management server 130 by transmitting a request including the data derived from a plaintext representation of the specified data or a truncated portion of the derived data to key management server 130. The truncated portion of the derived data may be generated by truncating the data derived from a plaintext to a length of n characters for use in deterministically generating a cryptographic key for data to be encrypted at application server 900. The length n of the truncated derived data may be set based on the number of unique entries that may exist within a universe of data. For example, the length n may be set such that a maximum number of records that may be compromised if a cryptographic key is lost or stolen is less than a threshold percentage of the possible entries in a universe of data. In some cases, hash truncator may additionally truncate the derived data based on a location in a string representation of the derived data from which the truncated cryptographic hash is generated. For example, the truncated derived data may be generated as the first n characters of a string representation of the derived data, the last n characters of the string representation of the derived data, or characters i through i+n−1 of the string representation of the derived data.

Query processor 920 generally encrypts the specified data using the one or more cryptographic keys generated by a remote key deriver and executes the received data queries against logically sharded database 930 in storage 910. To reduce the risk of exposing sensitive data, query processor 920 generally does not attempt to decrypt sensitive data included in a data write query or decrypt sensitive data included as a parameter in a data read query. For write queries, query processor 920 generally writes a record to logically sharded database 930 using the data included in the write requests, which, for sensitive data, may include a concatenation of a cryptographic key name and an encrypted version of the data to be stored in logically sharded database 930. For read queries, query processor 920 generally searches for one or more records in logically sharded database 930 matching the data included as parameters in the read query, which may, in some cases, include an encrypted version of a sensitive plaintext value.

As shown, storage 910 includes a logically sharded database 930. Data may be organized in the one or more data shards 930 based on a characteristic of the data associated with one or more fields in a record, such as the last four digits of a national identification number, a key used to encrypt the data, or other properties. By sharding a database into a plurality of data shards, with each shard including data encrypted using one or more cryptographic keys, the amount of data that is compromised when a cryptographic key is compromised may be limited.

Figure 10:
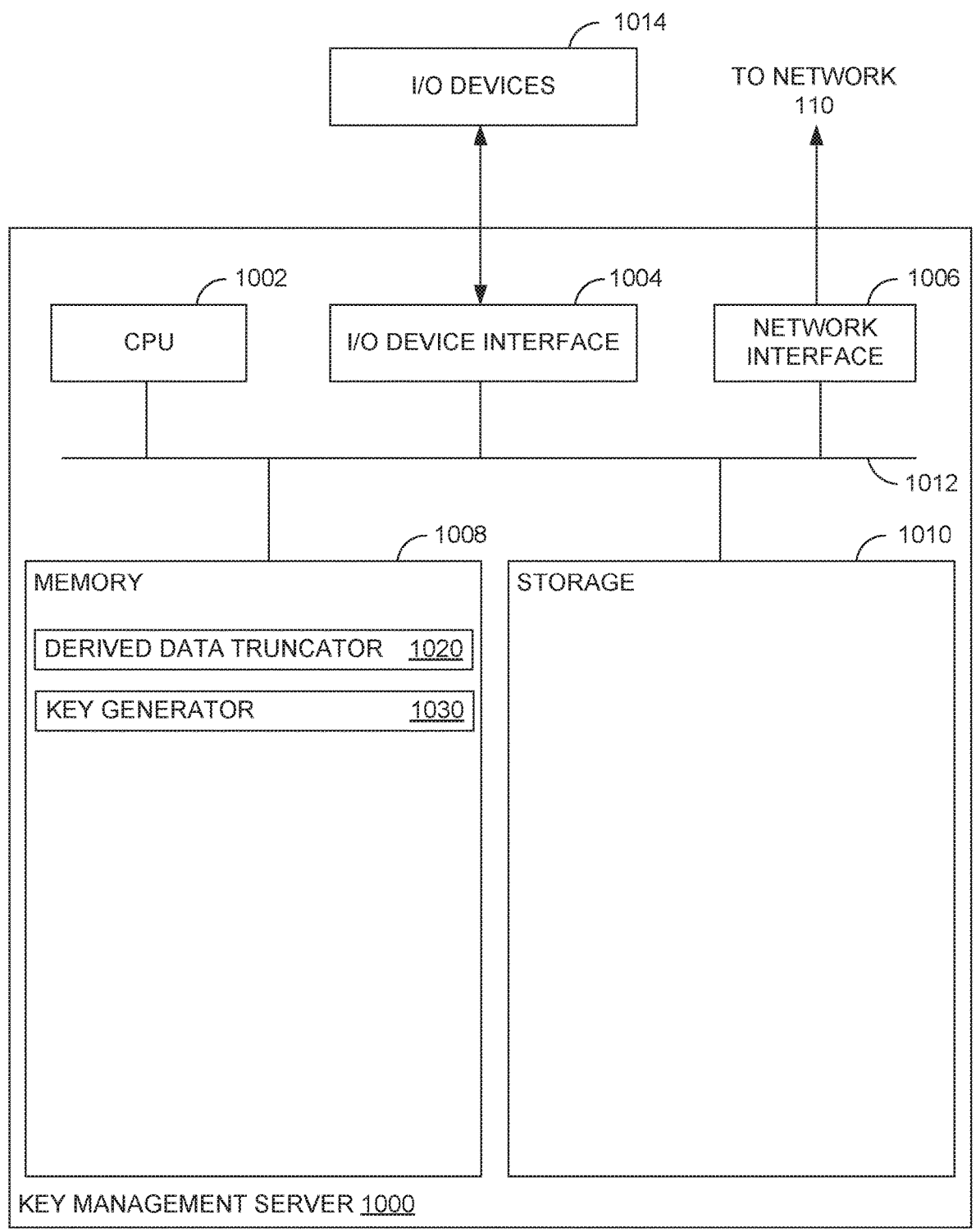
FIG. 10 illustrates an exemplary system for deterministically generating cryptographic keys for logically sharding data in a database, according to one embodiment.

FIG. 10 illustrates an exemplary key management server 100, according to an embodiment. As shown, the system 1000 includes, without limitation, a central processing unit (CPU) 1002, one or more I/O device interfaces 1004 which may allow for the connection of various I/O devices 1014 (e.g., keyboards, displays, mouse devices, pen input, etc.) to the system 1000, network interface 1006, a memory 1008, storage 1010, and an interconnect 1012.

CPU 1002 may retrieve and execute programming instructions stored in the memory 1008. Similarly, the CPU 1002 may retrieve and store application data residing in the memory 1008. The interconnect 1012 transmits programming instructions and application data, among the CPU 1002, I/O device interface 1004, network interface 1006, memory 1008, and storage 1010. CPU 1002 is included to be representative of a single CPU, multiple CPUs, a single CPU having multiple processing cores, and the like. Additionally, the memory 1008 is included to be representative of a random access memory. Furthermore, the storage 1010 may be a disk drive, solid state drive, or a collection of storage devices distributed across multiple storage systems. Although shown as a single unit, the storage 1010 may be a combination of fixed and/or removable storage devices, such as fixed disc drives, removable memory cards or optical storage, network attached storage (NAS), or a storage area-network (SAN).

As shown, memory 1008 includes a derived data truncator 1020 and a key generator 1030. Derived data truncator 1020 may be optional and need not execute where key management server 1000 receives a truncated version of data from a plaintext from an application server 120 as the basis for which key management server 1000 is to derive one or more cryptographic keys for use by application server 120. In some aspects, where derived data truncator 1020 receives a full-length string representing the data derived from the plaintext to be encrypted from an application server 120, derived data truncator 1020 truncates the derived data to a length of n characters for use in deterministically generating a cryptographic key for data to be encrypted at application server 120. The length n of the truncated derived data may be set based on the number of unique entries that may exist within a universe of data. For example, the length n may be set such that a maximum number of records that may be compromised if a cryptographic key is lost or stolen is less than a threshold percentage of the possible entries in a universe of data. In some cases, hash truncator may additionally truncate the derived data based on a location in a string representation of the derived data from which the truncated derived data is generated. For example, the truncated hash may be generated as the first n characters of a string representation of the derived data, the last n characters of the string representation of the derived data, or characters i through i+n−1 of the string representation of the derived data.

Key generator 1030 generally deterministically generates cryptographic keys based on truncated derived data received from an application server 120 or generated by hash truncator 1020 and information identifying a type of data to be encrypted, which key generator 1030 may receive from an application server 120. To generate a key, key generator 1030 generally uses a static initialization vector or base key associated with the type of data to be encrypted and, using a key derivation algorithm, as discussed above, derives a cryptographic key. In some cases, where a key rotation procedure is executing on a specific type of data, key generator 1030 can generate a pair of cryptographic keys and provide the pair of cryptographic keys to application server 1020 for use in encrypting and executing database queries against logically sharded database 142. The pair of cryptographic keys may include a first key derived from a current base cryptographic key or initialization vector and a second key derived from a new base cryptographic key or initialization vector.

Advantageously, deterministically generating cryptographic keys for a client device to use in encrypting sensitive data based on the plaintext values of sensitive data to be stored or retrieved from a database improves the security of sensitive data stored in a database. The increase in the number of keys used to secure sensitive data generally reduces the amount of data secured by a given cryptographic key. Because only a limited amount of data is secured by a given cryptographic key, the compromise of a single cryptographic key generally limits the amount of data that is compromised when a cryptographic key is exposed outside of an encryption system. Further, by deterministically generating cryptographic keys at a location remote from encryption, data need not be decrypted and re-encrypted when data is received at a server for processing (e.g., to be committed to a database or used as a search parameter in a database).

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for executing queries against a logically sharded database, comprising:
   receiving, from a client device, a query, wherein the query comprises one or more data items and wherein at least one of the one or more data items comprises sensitive data;
   obtaining, from a key management server, a cryptographic key to use to encrypt a record based on data derived from the one or more data items comprising sensitive data and a type of the sensitive data;
   generating an encrypted query based on the query and the obtained cryptographic key; and
   executing the encrypted query against the logically sharded database.

2. The method of claim 1, wherein obtaining the cryptographic key comprises:
   invoking a key derivation process at a key management server by transmitting a truncated hash and the type of the sensitive data; and
   receiving the cryptographic key from the key management server.

3. The method of claim 1, wherein the query comprises a write query, and wherein generating the encrypted query comprises encrypting the at least one of the one or more data items using the obtained cryptographic key.

4. The method of claim 1, wherein the query comprises a search query.

5. The method of claim 4, wherein obtaining the cryptographic key comprises:
   determining, based on a flag associated with the type of the sensitive data and a truncated version of the derived data, that a key rotation procedure is executing on records associated with the truncated version of the derived data;
   requesting a first cryptographic key associated with a current base key and a second cryptographic key associated with a replacement base key; and
   receiving the first and second cryptographic keys from the key management server.

6. The method of claim 5, wherein generating the encrypted query comprises generating a query including a first parameter comprising a value of the sensitive data encrypted using the first cryptographic key and a second parameter comprising a value of the sensitive data encrypted using the second cryptographic key.

7. The method of claim 6, further comprising:
   receiving an encrypted search result in response to the encrypted query;
   upon determining that the encrypted search result is encrypted using the first cryptographic key, decrypting the encrypted search result using the first cryptographic key; and
   upon determining that the encrypted search result is encrypted using the second cryptographic key, decrypting the encrypted search result using the second cryptographic key.

8. The method of claim 4, further comprising:
receiving an encrypted search result in response to executing the encrypted query;
decrypting the encrypted search result using the cryptographic key; and
transmitting the decrypted search result to the client device.

9. A system, comprising:
a processor; and
a memory having instructions stored thereon which, when executed by the processor, performs an operation for executing queries against a logically sharded database, the operation comprising:
receiving, from a client device, a query, wherein the query comprises one or more data items and wherein at least one of the one or more data items comprises sensitive data;
obtaining, from a key management server, a cryptographic key to use to encrypt a record based on data derived from the one or more data items comprising sensitive data and a type of the sensitive data;
generating an encrypted query based on the query and the obtained cryptographic key; and
executing the encrypted query against the logically sharded database.

10. The system of claim 9, wherein obtaining the cryptographic key comprises:
invoking a key derivation process at a key management server by transmitting a truncated hash and the type of the sensitive data; and
receiving the cryptographic key from the key management server.

11. The system of claim 9, wherein the query comprises a write query, and wherein generating the encrypted query comprises encrypting the at least one of the one or more data items using the obtained cryptographic key.

12. The system of claim 9, wherein the query comprises a search query.

13. The system of claim 12, wherein obtaining the cryptographic key comprises:
determining, based on a flag associated with the type of the sensitive data and a truncated version of the derived data, that a key rotation procedure is executing on records associated with the truncated version of the derived data;
requesting a first cryptographic key associated with a current base key and a second cryptographic key associated with a replacement base key; and
receiving the first and second cryptographic keys from the key management server.

14. The system of claim 13, wherein generating the encrypted query comprises generating a query including a first parameter comprising a value of the sensitive data encrypted using the first cryptographic key and a second parameter comprising a value of the sensitive data encrypted using the second cryptographic key.

15. The system of claim 14, wherein the operations further comprise:
receiving an encrypted search result in response to the encrypted query;
upon determining that the encrypted search result is encrypted using the first cryptographic key, decrypting the encrypted search result using the first cryptographic key; and
upon determining that the encrypted search result is encrypted using the second cryptographic key, decrypting the encrypted search result using the second cryptographic key.

16. The system of claim 12, further comprising:
receiving an encrypted search result in response to executing the encrypted query;
decrypting the encrypted search result using the cryptographic key; and
transmitting the decrypted search result to the client device.

17. A non-transitory computer-readable medium having instructions stored thereon which, when executed by a processor, performs an operation for executing queries against a logically sharded database, the operation comprising:
receiving, from a client device, a query, wherein the query comprises one or more data items and wherein at least one of the one or more data items comprises sensitive data;
obtaining, from a key management server, a cryptographic key to use to encrypt record based on data derived from the one or more data items comprising sensitive data and a type of the sensitive data;
generating an encrypted query based on the query and the obtained cryptographic key; and
executing the encrypted query against the logically sharded database.

18. The non-transitory computer-readable medium of claim 17, wherein the query comprises a write query, and wherein generating the encrypted query comprises encrypting the at least one of the one or more data items using the obtained cryptographic key.

19. The non-transitory computer-readable medium of claim 17, wherein the query comprises a search query, and wherein obtaining the cryptographic key comprises:
determining, based on a flag associated with the type of the sensitive data and a truncated version of the derived data, that a key rotation procedure is executing on records associated with the truncated version of the derived data;
requesting a first cryptographic key associated with a current base key and a second cryptographic key associated with a replacement base key; and
receiving the first and second cryptographic keys from the key management server.

20. The non-transitory computer-readable medium of claim 19, wherein generating the encrypted query comprises generating a query including a first parameter comprising a value of the sensitive data encrypted using the first cryptographic key and a second parameter comprising a value of the sensitive data encrypted using the second cryptographic key.

\* \* \* \* \*